US012811188B2

(12) United States Patent
Kim et al.

(10) Patent No.: US 12,811,188 B2
(45) Date of Patent: Nov. 24, 2026

(54) ALL SOLID-STATE BATTERY

(71) Applicant: SAMSUNG ELECTRO-MECHANICS CO., LTD., Suwon-si (KR)

(72) Inventors: Taehoon Kim, Suwon-si (KR); Seungjin Park, Suwon-si (KR); Minsoo Kim, Suwon-si (KR); Kyongbok Min, Suwon-si (KR); Kyunglock Kim, Suwon-si (KR); Eunhyuk Kim, Suwon-si (KR); Won-Seh Lee, Suwon-si (KR); Jeongwook Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 706 days.

(21) Appl. No.: 18/021,953

(22) PCT Filed: Nov. 14, 2022

(86) PCT No.: PCT/KR2022/017830

§ 371 (c)(1),
(2) Date: Feb. 17, 2023

(87) PCT Pub. No.: WO2023/106664

PCT Pub. Date: Jun. 15, 2023

(65) Prior Publication Data

US 2024/0283007 A1 Aug. 22, 2024

(30) Foreign Application Priority Data

Dec. 6, 2021 (KR) ........................ 10-2021-0173028

(51) Int. Cl.
*H01M 10/0562* (2010.01)
*H01M 4/58* (2010.01)

(52) U.S. Cl.
CPC ..... *H01M 10/0562* (2013.01); *H01M 4/5825* (2013.01); *H01M 2300/0071* (2013.01)

(58) Field of Classification Search
None
See application file for complete search history.

(56) References Cited

U.S. PATENT DOCUMENTS

2012/0015234 A1* 1/2012 Iwaya ..................... H01M 4/62 429/152
2013/0084500 A1* 4/2013 Takimoto ............ H01M 4/5825 429/231

(Continued)

FOREIGN PATENT DOCUMENTS

JP 2013-218838 A 10/2013
JP 2016-001595 A 1/2016

(Continued)

OTHER PUBLICATIONS

International Search Report dated Feb. 14, 2023 issued in International Patent Application No. PCT/KR2022/017830.

(Continued)

*Primary Examiner* — Ula C Ruddock
*Assistant Examiner* — Maria F Orozco
(74) *Attorney, Agent, or Firm* — Morgan, Lewis & Bockius LLP

(57) ABSTRACT

The present disclosure relates to an all-solid-state battery. Specifically, an embodiment provides a sintered all-solid-state battery including a positive electrode layer, a solid electrolyte layer, and a negative electrode layer; wherein the positive electrode layer and the negative electrode layer include the same or different electrode active material particles; the solid electrolyte layer includes solid electrolyte particles; and an average diameter (a) of the electrode active (Continued)

material particles and an average diameter (b) of the solid electrolyte particles satisfy a relationship of an Equation 1:

$$0.5 \leq (b/a) \leq 2.5 \quad \text{[Equation 1]}$$

17 Claims, 2 Drawing Sheets

(56) References Cited

U.S. PATENT DOCUMENTS

| | | | | |
|---|---|---|---|---|
| 2013/0189562 | A1* | 7/2013 | Dolle | H01M 4/139 29/623.5 |
| 2014/0234725 | A1 | 8/2014 | Ogawa et al. | |
| 2015/0333330 | A1 | 11/2015 | Sato et al. | |
| 2015/0333362 | A1 | 11/2015 | Sato et al. | |
| 2015/0333366 | A1* | 11/2015 | Sato | H01M 10/0525 429/319 |
| 2020/0091518 | A1 | 3/2020 | Tsukada | |
| 2020/0313161 | A1 | 10/2020 | Isojima et al. | |

FOREIGN PATENT DOCUMENTS

| | | | | |
|---|---|---|---|---|
| JP | 2017-157305 | A | 9/2017 | |
| JP | 2018-018578 | A | 2/2018 | |
| JP | WO2019-151372 | A1 | 8/2019 | |
| JP | 6623542 | B2 | 12/2019 | |
| JP | 6651708 | B2 | 2/2020 | |
| JP | 2020-198254 | A | 12/2020 | |
| KR | 10-2011-0106342 | A | 9/2011 | |
| KR | 10-2013-0034010 | A | 4/2013 | |
| KR | 10-2020-0020649 | A | 2/2020 | |
| WO | WO-2014057804 | A1 * | 4/2014 | C22F 1/00 |
| WO | WO-2018020990 | A1 * | 2/2018 | H01M 10/0562 |

OTHER PUBLICATIONS

Korean Office Action dated Oct. 13, 2025 issued in Korean Patent Application No. 10-2021-0173028 (with English translation).

Notice of Allowance dated Aug. 7, 2026 of the corresponding Korean Patent Application No. 10-2021-0173028 with English translation.

* cited by examiner

[Fig. 1]
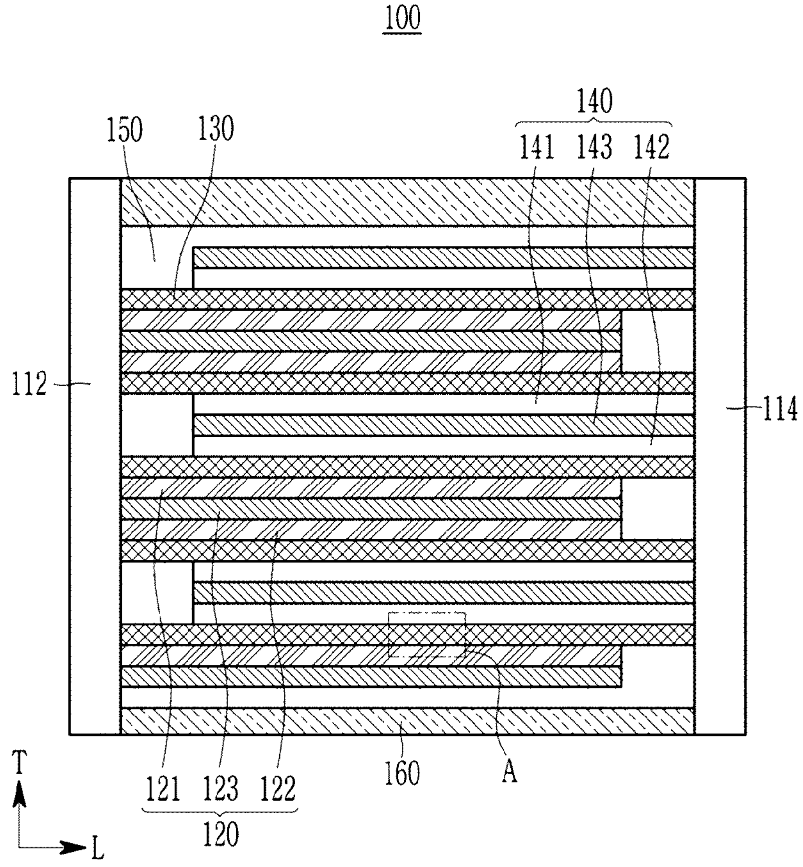
[Fig. 2]
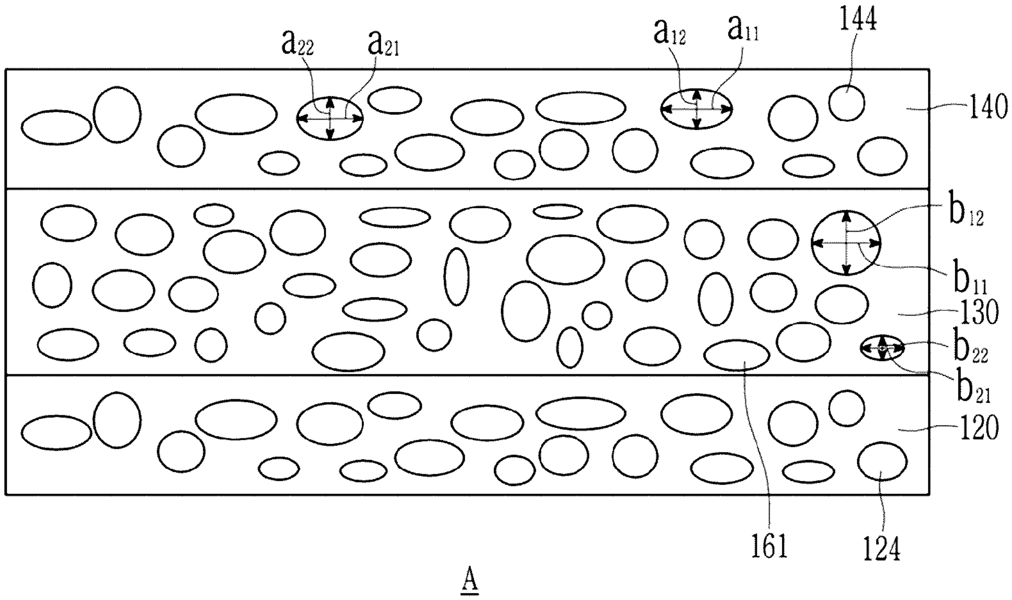

[Fig. 3]
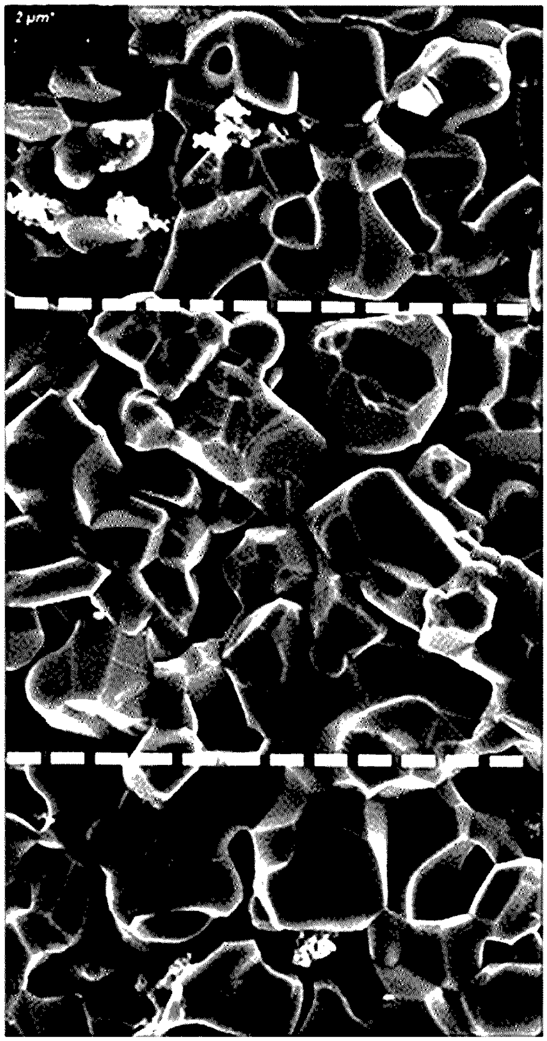

ALL SOLID-STATE BATTERY

CROSS-REFERENCE OF RELATED APPLICATIONS

This application is the U.S. National Phase under 35 U.S.C. § 371 of International Patent Application No. PCT/KR2022/017830, filed on Nov. 14, 2022, which in turn claims the benefit of Korean Application No. 10-2021-0173028, filed on Dec. 6, 2021, the entire disclosures of which applications are incorporated by reference herein.

TECHNICAL FIELD

The present disclosure relates to an all-solid-state battery.

BACKGROUND ART

A rechargeable lithium battery is widely used as a power source for driving a small electronic device such as a mobile phone, a laptop, a smart phone, and the like and more expansively applied as a power source for driving an electric vehicle and storing power for an energy storage device and the like.

The most common type of the rechargeable lithium battery is a lithium ion battery, which uses a liquid electrolyte and thus has a problem (e.g., potential danger of leakage, ignition, explosion, and the like).

Recently, as a next-generation battery that solves the problems of the lithium ion battery, an "all-solid-state battery" in which the liquid electrolyte is replaced with a solid electrolyte is in the spotlight. However, for the industrial mass production of an all-solid-state battery, it is a prerequisite to lower an interfacial resistance between a solid electrolyte layer and an electrode layer.

Specifically, as a method for manufacturing an all-solid-state battery, a method of manufacturing "sintered all-solid-state battery" which includes stacking a solid electrolyte layer and an electrode layer (specifically, a positive electrode layer and a negative electrode layer) in an appropriate arrangement, and then sintering it in a high-temperature furnace is known. However, the generally known sintered all-solid-state battery has a problem in that the interfacial resistance between an solid electrolyte layer and an electrode layer is high, and thus the capacity is low compared to the lithium ion battery.

DISCLOSURE OF INVENTION

Solution to Problem

An embodiment secures a high capacity of an all-solid-state battery by lowering an interfacial resistance between a solid electrolyte layer and an electrode layer.

An embodiment provides a sintered all-solid-state battery including a positive electrode layer, a solid electrolyte layer, and a negative electrode layer; wherein the positive electrode layer and the negative electrode layer include the same or different electrode active material particles; and the solid electrolyte layer includes solid electrolyte particles; an average diameter (a) of the electrode active material particles and the average diameter (b) of the solid electrolyte particles satisfy the relationship of Equation 1:

$$0.5 \leq (b/a) \leq 2.5 \qquad \text{[Equation 1]}$$

The average diameter (a) of the electrode active material particles and the average diameter (b) of the solid electrolyte particles may satisfy the relationship of Equation 1-1:

$$1.1 \leq (b/a) \leq 1.4 \qquad \text{[Equation 1-1]}$$

The electrode active material particles may include particles represented by Chemical Formula 1:

[Chemical Formula 1]

$$Li_x V_{2-y}M_y(P0_4)_3$$

In Chemical Formula 1, M is at least one selected from the group consisting of Fe, Co, Mn, Cu, Zn, Al, Sn, B, Ga, Cr, V, Ti, Mg, Ca, Sr, and Zr; $1 \leq x \leq 3$; $0 \leq y < 2$; and $2 \leq z \leq 3$.

The average diameter (a) of the electrode active material particles may be about 2 μm to about 10 μm.

The solid electrolyte particles may include particles represented by the Chemical Formula 2:

[Chemical Formula 2]

$$Li_{1+y}Al_yTi_{2-y}(PO_4)_3$$

In Chemical Formula 2, $0 \leq y \leq 0.6$.

The average diameter (b) of the solid electrolyte particles may be about 2 μm to about 10 μm.

The positive electrode layer and the negative electrode layer may each independently include a current collector; and an electrode active material layer disposed on one or both surfaces of the current collector and including the electrode active material particles.

The electrode active material layer may further include solid electrolyte particles that are the same as or different from those of the solid electrolyte layer.

The electrode active material layer may include the electrode active material particles and the solid electrolyte particles in a weight ratio of about 1:9 to about 9:1.

The electrode active material layer may further include a conductive material.

The solid electrolyte particles may be included in an amount of about 15 wt % to about 60 wt %, the conductive material may be included in an amount of about 1 wt % to about 5 wt %, and the electrode active material particles may be included in the balance based on the total weight of the electrode active material layer.

The electrode active material layer may have a thickness of about 1.0 μm to about 20 μm.

The current collector may include copper particles.

An average diameter of the copper particles may be about 0.5 μm to about 5 μm.

A thickness of the solid electrolyte layer may be about 1.0 μm to about 30 μm.

The sintered all-solid-state battery may include a body including the positive electrode layer and the negative electrode layer alternately stacked with the solid electrolyte layer interposed therebetween.

The sintered all-solid-state battery may further include a first external electrode and a second external electrode respectively disposed on both sides of the body.

Another embodiment provides an all-solid-state battery including a positive electrode layer, a solid electrolyte layer, and a negative electrode layer; wherein the positive electrode layer and the negative electrode layer include electrode active material particles represented by Chemical Formula 1 that are the same as or different from each other; the solid electrolyte layer includes solid electrolyte particles represented by Chemical Formula 2; and an average diameter (a) of the electrode active material particles and an average diameter (b) of the solid electrolyte particles satisfy the relationship of Equation 1:

$$Li_x V_{2-y}M_y(PO_4)_3 \qquad \text{[Chemical Formula 1]}$$

In Chemical Formula 1, M is at least one selected from the group consisting of Fe, Co, Mn, Cu, Zn, Al, Sn, B, Ga, Cr, V, Ti, Mg, Ca, Sr, and Zr, $1 \leq x \leq 3$; $0 \leq y \leq 2$; and $2 \leq z \leq 3$;

$$Li_{1+y}Al_yTi_{2-y}(PO_4)_3 \qquad \text{[Chemical Formula 2]}$$

In Chemical Formula 2, $0 \leq y \leq 0.6$;

$$0.5 \leq (b/a) \leq 2.5 \qquad \text{[Equation 1]}$$

The all-solid-state battery may be a sintered all-solid-state battery.

Advantageous Effects of Invention

In the all-solid-state battery according to an embodiment, as a result of controlling the relationship between the average diameter of the electrode active material particles and the average diameter of the solid electrolyte particles as described above, the interfacial resistance between the solid electrolyte layer and the electrode layer is lowered and high capacity is secured.

BRIEF DESCRIPTION OF DRAWINGS

FIG. 1 schematically shows a cross-sectional view of an all-solid-state battery according to an embodiment.

FIG. 2 is an enlarged view of area A of FIG. 1.

FIG. 3 is an SEM photograph of the cut surface of the all-solid-state battery of Example 4 when cut in the stacking direction.

BEST MODE FOR CARRYING OUT THE INVENTION

Hereinafter, embodiments of the present disclosure will be described in detail. However, this is presented as an example, and the present disclosure is not limited thereto, and the present disclosure is only defined by the scope of the claims described below.

As used herein, when specific definition is not otherwise provided, layer, when a part such as a layer, film, region, plate, etc. is "on" another portion, it is not only when it is "on" another portion, but also when there is another portion in the middle.

As used herein, the term "sintered" refers to a phenomenon in which a powder formed by press-molding into an appropriate shape is tightly adhered to each other and solidified when heated.

As used herein, "average diameter of particles" or "average size of particles" means an average of major lengths and short lengths of the particles. Herein, the conditions for respectively measuring the major axis lengths and short axis lengths of the particles are not particularly limited, but a scanning electron microscope (SEM) made by Carl Zeiss AG is used to take an SEM photograph of a plurality of the particles at a magnification of 10,000 times and measure a major axis length and a short axis length of each particle and average them, obtaining an average of all the particles on the SEM photograph. In other words, the "average diameter of particles" or "average size of particles" may be obtained according to the following equation A.

$$\left[\sum\{(\text{average of major axis length and short axis length of first particle}) + (\text{average of major axis length and short axis length of second particle}) + \ldots + (\text{average of major axis length and short axis length of } n^{th} \text{ particle})\}\right]/n \qquad \text{[Equation A]}$$

In the equation, n is an integer of 1 or more and has no upper limit, but as n is larger within the range of 100 or more, the "average diameter of particles" or "average size of the particles" exhibits higher reliability.

Through the specification, 'stacking direction' refers to a direction in which components are sequentially accumulated and may be a 'thickness direction' perpendicular to a wide surface (main surface) of the components having a sheet shape and corresponds to a T-axis direction in the drawing. In addition, 'side direction' is a direction extending parallel to the wide surface (main surface) from edges of the components having a sheet shape and may be a 'plane direction' and corresponds to a L axis direction in the drawing.

First Embodiment

An embodiment provides a sintered all-solid-state battery including a positive electrode layer, a solid electrolyte layer, and a negative electrode layer; wherein the positive electrode layer and the negative electrode layer include the same or different electrode active material particles; the solid electrolyte layer includes solid electrolyte particles; and an average diameter (a) of the electrode active material particles and an average diameter (b) of the solid electrolyte particles satisfy the relationship of Equation 1:

$$0.5 \leq (b/a) \leq 2.5 \qquad \text{[Equation 1]}$$

Since the all-solid-state battery according to the first embodiment corresponds to a 'sintered all-solid-state battery', even if not specifically mentioned, the average diameter (a) of the electrode active material particles and the average diameter (b) of the solid electrolyte particles are respectively diameters 'after sintering'.

As pointed out above, the sintered all-solid-state battery has a high interfacial resistance between solid electrolyte layer and electrode layer and a problem of lower capacity than that of a lithium ion battery. This result is obtained due to the relationship between the diameter of the electrode active material particles and the diameter of the solid electrolyte particles.

Specifically, when a difference between an average diameter (c) of the electrode active material particles before sintering and an average diameter (d) of the solid electrolyte particle before the sintering is excessive, either one layer of the electrode active material layer and the solid electrolyte layer during the sintering is excessively contracted.

For example, when an average diameter (c) of the electrode active material particles before the sintering is extremely smaller than an average diameter (d) of the solid electrolyte particles before the sintering, the electrode layer starts to contract at a lower temperature than the solid electrolyte layer does, obtaining a sintered all-solid-state battery in which the electrode layer is excessively shrunk compared with the solid electrolyte layer. Conversely, when the average diameter (d) of the solid electrolyte particles before the sintering is extremely smaller than the average diameter (c) of the electrode active material particles before the sintering, the solid electrolyte layer starts to contract at a lower temperature than the electrode layer, obtaining a sintered all-solid-state battery in which the solid electrolyte layer is extremely shrunk compared with the electrode layer.

As such, when either one of the electrode layer and the solid electrolyte layer is extremely shrunk, interfacial resistance of the electrode layer and the solid electrolyte layer increases, resultantly deteriorating capacity of the sintered all-solid-state battery.

On the other hand, when a difference between the average diameter (c) of the electrode active material particle before the sintering and the average diameter (d) of the solid electrolyte particle before the sintering is controlled within an appropriate range, the electrode layer and the solid electrolyte layer start to contract at similar temperatures, obtaining a sintered all-solid-state battery in which the electrode layer and the solid electrolyte layer are equivalently contracted.

In fact, when the average diameter (d) of the solid electrolyte particles before the sintering is controlled within about 0.5 times to about 2.5 times of the average diameter (c) of the electrode active material particles before the sintering, compared with when not controlled within this range, the interfacial resistance of the solid electrolyte layer and the electrode layer significantly decreases and thereby, significantly increases capacity of the sintered all-solid-state battery. The average diameter (b) of the solid electrolyte particles after the sintering is controlled within about 0.5 times to about 2.5 times of the average diameter (a) of the electrode active material particles after the sintering. This is supported by evaluation examples described later.

Hereinafter, the sintered all-solid-state battery of the first embodiment is described in detail.

b/a Relationship

As aforementioned, the average diameter (b) of the solid electrolyte particles after the sintering and the average diameter (a) of the electrode active material particles after the sintering has relationship satisfying Equation 1, lowering the interfacial resistance of the solid electrolyte layer and the electrode layer and thus securing high capacity of a sintered all-solid-state battery:

$$0.5 \leq (b/a) \leq 2.5 \quad \text{[Equation 1]}$$

Specifically, the lower limit of Equation 1 may be controlled to be about 0.5, about 0.7, about 0.9, or about 1.1: the upper limit may be controlled to be about 2.5, about 2.3, about 2.1, about 1.9, about 1.7, about 1.5, or about 1.4.

For example, the average diameter (a) of the electrode active material particles after the sintering and the average diameter (b) of the solid electrolyte particles after the sintering may satisfy relationship of Equation 1-1:

$$1.1 \leq (b/a) \leq 1.4 \quad \text{[Equation 1-1]}$$

Particularly, when the average diameter (a) of the electrode active material particles after the sintering and the average diameter (b) of the solid electrolyte particles after the sintering are similar enough to satisfy Equation 1-1, the interfacial resistance of the solid electrolyte layer and the electrode layer may significantly decrease, and capacity of the sintered all-solid-state battery may also be further increased:

Composition and Average Diameter (a) of Electrode Active Material Particles after Sintering The positive electrode layer and the negative electrode layer include the same or different electrode active material particles.

After the sintering, the electrode active material particles may include LVP-based particles represented by Chemical Formula 1:

$$Li_x V_{2-y}M_y(PO_4)_3 \quad \text{[Chemical Formula 1]}$$

In Chemical Formula 1, M is at least one selected from the group consisting of Fe, Co, Mn, Cu, Zn, Al, Sn, B, Ga, Cr, V, Ti, Mg, Ca, Sr, and Zr; $1 \leq x \leq 3$; $0 \leq y < 2$; and $2 \leq z < 3$.

For example, the positive electrode layer and the negative electrode layer may include the same electrode active material particles, and may include $Li_3V_2(PO_4)_3$ particles.

On the other hand, in the sintering process, electrode active material primary particles are aggregated with each other or bonded with an solid electrolyte, forming secondary particles, or electrode active material secondary particles are aggregated, forming larger secondary particles. Accordingly, the diameter (a) of the electrode active material particles after the sintering may be much larger than the diameter (c) of the electrode active material particles before the sintering.

Specifically, the average diameter (a) of the electrode active material particles after the sintering may be about 2 μm to about 5 μm. For example, the average diameter (a) of the electrode active material particles after the sintering may be greater than or equal to about 2 μm, greater than or equal to about 2.2 μm, greater than or equal to about 2.4 μm, greater than or equal to about 2.6 μm, or greater than or equal to about 2.8 μm and less than or equal to about 5 μm, less than or equal to about 4.8 μm, less than or equal to about 4.6 μm, or less than or equal to about 4.5 μm.

The average diameter (a) of the electrode active material particles after the sintering may be increased, as diameter (c) of the electrode active material particles before the sintering is larger, and as the sintering temperature is higher.

Composition and Average Diameter (b) of Solid Electrolyte Particles after Sintering The solid electrolyte particles after sintering may include LATP-based particles represented by Chemical Formula 2:

$$Li_{1+y}Al_yTi_{2-y}(PO_4)_3 \quad \text{[Chemical Formula 2]}$$

In Chemical Formula 2, $0 < y \leq 0.6$.

For example, the solid electrolyte particles may include $L_{1.3}Al_{0.3}Ti_{1.7}(PO_4)_3$ particles.

On the other hand, solid electrolyte primary particles may be aggregated with each other or bonded with the electrode active material during the sintering, forming secondary particles, or solid electrolyte secondary particles may be aggregated, forming much larger secondary particles. During the sintering, the solid electrolyte primary particles may be aggregated, forming secondary particles, or the solid electrolyte secondary particles may be aggregated, forming much larger secondary particles. Accordingly, the average diameter (b) of the solid electrolyte particles after the sintering may be much larger than the average diameter (d) of the solid electrolyte particles before the sintering.

Specifically, the average diameter (b) of the solid electrolyte particles after the sintering may be about 2 μm to about 10 μm. For example, the average diameter (b) of the solid electrolyte particles after the sintering may be greater than or equal to about 2 μm, greater than or equal to about 2.5 μm, greater than or equal to about 3 μm, greater than or equal to about 3.5 μm, or greater than or equal to about 4 μm and less than or equal to about 10 μm, less than or equal to about 9 μm, less than or equal to about 8 μm, less than or equal to about 7 μm, or less than or equal to about 6 μm.

The average diameter (b) of the solid electrolyte particles after the sintering may be increased, as the average diameter (d) of the solid electrolyte particles before the sintering is larger, the sintering temperature is higher, and the sintering time is longer.

Electrode Layer after Sintering (Positive Electrode Layer and Negative Electrode Layer)

The positive electrode layer and the negative electrode layer may each independently include a current collector; and an electrode active material layer disposed on one or both surfaces of the current collector and including the electrode active material particles.

Specifically, when the electrode active material layer is disposed on both sides of the current collector, capacity of the sintered all-solid-state battery may be higher than when the electrode active material layer is disposed on one side of the current collector.

The electrode active material layer may further include the same or different sintered solid electrolyte particles from the solid electrolyte layer. Specifically, the electrode active material layer may include particles represented by Chemical Formula 2 as the same sintered solid electrolyte particles as the solid electrolyte layer.

Herein, the electrode active material layer may include the electrode active material particles after the sintering and the solid electrolyte particles after the sintering in a weight ratio of about 1:9 to about 9:1, specifically, about 2:8 to about 8:2, more specifically, about 3:7 to about 7:3, or for example, about 4:6 to about 6:4 (electrode active material particle after the sintering: solid electrolyte particles after the sintering). Within the ranges, an ion conductive network in the electrode active material layer may be improved.

In addition, the electrode active material layer may further include a conductive material. The conductive material may also be in a form after sintering.

The conductive material is used to impart conductivity to the electrode layer, and in the configured battery, any electronically conductive material can be used without causing chemical change. Examples thereof may include a conductive material including a carbon-based material such as natural graphite, artificial graphite, carbon black, acetylene black, denka black, ketjen black, furnace black, an activated carbon fiber; a metal-based material containing copper, nickel, aluminum, silver or the like and in the form of a metal powder or a metal fiber, a conductive polymer such as a polyphenylene derivative; or a mixture thereof.

For example, the conductive material may be carbon black, acetylene black, Denka black, Ketjen black, furnace black, activated carbon, or a combination thereof as an amorphous carbon-based material. Examples of the carbon black may include Super P (Super P, Timcal).

The solid electrolyte particles may be included in an amount of about 15 wt % to about 60 wt %, the conductive material may be included in an amount of about 1 wt % to about 5 wt %, and the electrode active material particles may be included in the balance based on the total weight of the electrode active material layer.

A thickness of the electrode active material layer is not particularly limited, but may be about 1.0 μm to about 20 μm after sintering.

The current collector may include copper particles, and an average diameter of the copper particles may be about 0.5 μm to about 5 μm after sintering.

Solid Electrolyte Layer after Sintering

A thickness of the solid electrolyte layer is not particularly limited, but may be about 1.0 μm to about 30 μm after sintering.

Structure of Sintered all-Solid-State Battery

FIG. 1 schematically shows a cross-sectional view of an all-solid-state battery according to an embodiment.

The sintered all-solid-state battery 100 of the first embodiment includes a body that includes a solid electrolyte layer 130 and a positive electrode layer 120 and a negative electrode layer 140 that are alternately stacked with the solid electrolyte layer 130 interposed therebetween.

In addition, the sintered all-solid-state battery 100 of the first embodiment may further include a first external electrode 112 and a second external electrode 114 respectively disposed on both sides of the body.

Specifically, the all-solid-state battery includes the electrode layers 120 and 140 and the solid electrolyte layer 130 disposed adjacent to the electrode layers in the stacking direction. The electrode layers may basically include current collectors 123 and 143 and electrode active material layers 121, 122, 141, and 142 disposed on one surface or both sides of the current collectors 123 and 143.

For example, an electrode layer located at the top in the stacking direction is formed by coating the negative electrode active material layer 141 on one surface of the negative current collector 143, and another electrode layer located at the bottom is formed by forming the positive electrode active material layer 121 on one surface of the positive electrode current collector 123. In addition, electrode layers located between the top and bottom are formed by coating the positive electrode active material layers 121 and 122 on both surfaces of the positive electrode current collector 123 or the negative electrode active material layers 141 and 142 on both surfaces of the negative current collector 143.

The solid electrolyte layer 130 may be interposed between the positive electrode layer 120 and the negative electrode layer 140 and stacked. Accordingly, the solid electrolyte layer 130 may be disposed adjacent between the positive electrode active material layers 121 and 122 of the positive electrode layer 120 and the negative electrode active material layers 141 and 142 of the negative electrode layer 140 in the stacking direction. Accordingly, a plurality of the positive electrode layers 120 and the negative electrode layers 140 are alternately disposed in the all-solid-state battery 100, and a plurality of solid electrolyte layers 130 may be disposed therebetween and stacked.

An insulation layer 150 may be disposed along edges of the positive electrode layers and the negative electrode layers. The insulation layer 150 is disposed on the solid electrolyte layer 130 and may be laterally adjacent to the edges of the positive electrode layer or the negative electrode layer. Accordingly, the insulation layer 150 may be disposed on the same layer as the positive electrode layer and the negative electrode layer, respectively. The insulation layer 150 may be formed of the same material as the solid electrolyte layer 130. Accordingly, the insulation layer 150 and the solid electrolyte layer 130 are not distinguished on the boundary but integrally formed into the solid electrolyte layer 130 in the all-solid-state battery.

The positive electrode layer 120, the solid electrolyte layer 130, the negative electrode layer 140, and the insulation layer 150 may be stacked as described above and form a cell stack of the all-solid-state battery 100. A protective layer 160 may be formed of an insulating material on the upper and lower ends of the cell stack of the all-solid-state battery 100. In addition, a terminal of the positive electrode current collector 123 and a terminal of the negative current collector 143 are exposed on both sides of the cell stack of the all-solid-state battery, and the external electrodes 112 and 114 are connected to the exposed terminals. In other words, the external electrodes 112 and 114 are connected to the terminal of the positive electrode current collector 123 to be a positive electrode and also, to the terminal of the negative current collector 143 to be a negative electrode. When the terminal of the positive electrode current collector 123 and the terminal of the negative current collector 143 are configured to face in opposite directions to each other, the electrodes 112 and 114 also may be located on both sides, respectively.

The positive electrode layer 120, the solid electrolyte layer 130, and the negative electrode layer 140 are stacked, forming a cell stack of an all-solid-state battery. The protective layer 160 may be formed of an insulating material at the upper end and lower end of the cell stack of the all-solid-state battery, and this insulating material may be the same material as the solid electrolyte layer 130.

FIG. 2 is an enlarged view of area A of FIG. 1.

As aforementioned, the solid electrolyte layer 130, the positive electrode layer 120, and the negative electrode layer 140 are each used by one and have a structure that the positive electrode layer 120 is disposed on one surface of the solid electrolyte layer 130, while the negative electrode layer 140 is disposed on the other surface.

The positive electrode layer 120 and the negative electrode layer 140 may include the same or different electrode active material particles 124 and 144; and the solid electrolyte layer 130 includes solid electrolyte particles 134. For convenience, a size of particles included in each layer is exaggeratedly shown in FIG. 2.

The diameter (a) of the electrode active material particles 124 and 144 may be obtained by measuring each major axis lengths and short axis lengths of individual particles, respectively and averaging them. Specifically, a first electrode active material particle having a major axis length of $a_{11}$ and a short axis length of $a_{12}$ may have a diameter of $(a_{11}+a_{12})/2$.

In order to increase reliability of the diameter (a) of the electrode active material particles 124 and 144, diameters of two or more electrode active material particles may be averaged. Specifically, a particle diameter of a first electrode active material particle having a major axis length of $a_{11}$ and a short axis length of $a_{12}$ and a second electrode active material particle having a major axis length of $a_{21}$ and a short axis length of $a_{22}$ may be obtained according to [Σ{(average of major axis length of $a_{11}$ and short axis length of $a_{12}$ of first electrode active material particle)+(major axis length of $a_{21}$ and short axis length of $a_{22}$ of second electrode active material particle))}]/2.

The diameter (b) of the solid electrolyte particles 134 may be obtained by measuring major and short axis lengths of individual particles and averaging them. Specifically, a diameter of the first solid electrolyte particle having a major axis length $b_{11}$ and a short axis length of $b_{12}$ may have $(b_{11}+b_{12})/2$.

In order to increase reliability of the diameter (a) of the solid electrolyte particles 134, an average diameter of two or more solid electrolyte particles may be obtained. Specifically, a particle diameter of a first solid electrolyte particle having a major axis length of $b_{11}$ and a short axis length of $b_{12}$ and a second solid electrolyte particle having a long axis length of $b_{21}$ and a short axis length of $b_{22}$ may be obtained according to [Σ{(average of major axis length and short axis length of first solid electrolyte particle)+(average of major axis length and short axis length of second solid electrolyte particle)}]/2.

In fact, conditions for respectively measuring the major axis lengths and short axis lengths of the particles are not particularly limited, but a scanning electron microscope (SEM) made by Carl Zeiss AG and the like is used to take an SEM photograph of a plurality of particles at a magnification of 10,000 times and then, measure a major axis length and a short axis length of individual particles on the SEM photograph and average them of the individual particles, obtaining an average diameter of all the particles displayed on the SEM photograph. In other words, "diameter of particles" or "size of particles" may be obtained according to Equation A.

$$\left[\sum\{(\text{average of major axis length and short axis length of first particle}) + (\text{average of major axis length and short axis length of second particle}) + \ldots + (\text{average of major axis length and short axis length of } n^{th} \text{ particle})\}\right]/n \quad \text{[Equation A]}$$

In the equation, n is an integer of 1 or more, and the upper limit thereof is not limited, but as n is larger within a range of 100 or more, reliability of the "diameter of particles" or "size of particles" is higher.

Second Embodiment

Another embodiment provides an all-solid-state battery including a positive electrode layer, a solid electrolyte layer, and a negative electrode layer, wherein the positive electrode layer and the negative electrode layer include electrode active material particles represented by Chemical Formula 1 that are the same as or different from each other; the solid electrolyte layer includes solid electrolyte particles represented by Chemical Formula 2; and an average diameter (a) of the electrode active material particles and an average diameter (b) of the solid electrolyte particles satisfy the relationship of Equation 1:

$$Li_x V_{2-y}M_y(PO_4)_3 \quad \text{[Chemical Formula 1]}$$

wherein, in Chemical Formula 1, M is at least one selected from the group consisting of Fe, Co, Mn, Cu, Zn, Al, Sn, B, Ga, Cr, V, Ti, Mg, Ca, Sr, and Zr; $1 \leq x \leq 3$; $0 \leq y < 2$; $2 \leq z < 3$;

$$Li_{1+y}Al_yTi_{2-y}(PO_4)_3 \quad \text{[Chemical Formula 2]}$$

wherein, in Chemical Formula 2, $0 < y \leq 0.6$;

$$0.5 \leq (b/a) \leq 2.5 \quad \text{[Equation 1]}$$

Since the all-solid-state battery according to the second embodiment may be a 'sintered all-solid-state battery', the description of the all-solid-state battery according to the second embodiment may be the same as that of the all-solid-state battery according to the first embodiment.

All-Solid-State Battery of Third Embodiment

Another embodiment provides an all-solid-state battery being a sintered all-solid-state battery including a positive electrode layer, a solid electrolyte layer, and a negative electrode layer, wherein the positive electrode layer and the negative electrode layer include the same or different electrode active material particles; the solid electrolyte layer includes solid electrolyte particles; an average diameter (c) of the electrode active material particles and an average diameter (d) of the solid electrolyte satisfy the relationship of Equation 2:

$$0.5 \leq (d/c) \leq 2.5 \quad \text{[Equation 2]}$$

An all-solid-state battery according to the third embodiment is an all-solid-state battery before sintering, and even if not specifically mentioned, the diameter (d) of the electrode active material particle and the diameter (d) of the solid electrolyte particle are respectively a diameter before the 'sintering,' respectively.

When the diameter (d) of the solid electrolyte particle before the sintering is controlled within about 0.5 times to about 2.5 times of the diameter (c) of the electrode active material particle before the sintering, the interfacial resistance of the solid electrolyte layer and the electrode layer significantly decreases, thereby significantly increasing capacity of the sintered all-solid-state battery. This is the same as described above and also supported by evaluation examples described later.

d/c Relationship

As described above, when the diameter (d) of the solid electrolyte particles before the sintering and the diameter (c) of the electrode active material particles before the sintering are controlled to satisfy relationship of the Equation 2, interfacial resistance of the solid electrolyte layer and the electrode layer during the sintering may be suppressed from increasing, finally obtaining a sintered all-solid-state battery with high capacity:

$$0.5 \leq (d/c) \leq 2.5 \quad \text{[Equation 2]}$$

Specifically, the lower limit of Equation 2 may be controlled to about 0.5, about 0.7, about 0.9, about 1.1, or about 1.3; the upper limit may be controlled to about 2.5, about 2.4, or about 2.3.

Within this range, the diameter (b) of the solid electrolyte particles after the sintering and the diameter (a) of the electrode active material particles after the sintering may be controlled to satisfy Equation 1.

Diameter (c) of Electrode Active Material Particles Before Sintering

The diameter (c) of the electrode active material particles before the sintering may be about 0.5 μm to about 5 μm. For example, the diameter (c) of the electrode active material particles before the sintering may be greater than or equal to about 0.5 μm and less than or equal to about 5 μm, less than or equal to about 1.5 μm, less than or equal to about 1.0 μm, less than or equal to about 0.8 μm, or less than or equal to about 0.6 μm.

Diameter (d) of Solid Electrolyte Particles Before Sintering

The diameter (d) of the solid electrolyte particles before the sintering may be about 0.5 μm to about 2 μm. For example, the diameter (d) of the solid electrolyte particles before the sintering may be greater than or equal to about 0.5 μm, greater than or equal to about 0.6 μm, greater than or equal to about 0.7 μm, or greater than or equal to about 0.8 μm and less than or equal to about 2 μm, less than or equal to about 1.8 μm, less than or equal to about 1.6 μm, or less than or equal to about 1.4 μm.

Electrode Layer Before Sintering (Positive Electrode Layer and Negative Electrode Layer)

The thickness of the electrode active material layer is not particularly limited, but may be about 1.0 μm to about 25 μm before sintering.

The current collector may include copper particles, and the diameter of the copper particles may be about 0.5 μm to about 8 μm before sintering.

Solid Electrolyte Layer after Sintering

A thickness of the solid electrolyte layer is not particularly limited, but may be about 1.0 μm to about 35 μm before sintering.

Except for the above description, the rest of the description of the sintered all-solid-state battery according to the first embodiment may be equally applied to the all-solid-state battery according to the second embodiment.

MODE FOR THE INVENTION

Hereinafter, examples of the present disclosure and comparative examples are described. These examples, however, are not in any sense to be interpreted as limiting the scope of the present disclosure.

Example 1

Manufacture of Solid Electrolyte Layer $Li_{1.3}Al_{0.3}Ti_{1.7}(PO_4)_3$ particles having a diameter of 0.8 μm as solid electrolyte particles, PVB as a binder, and a mixed solvent of toluene and ethanol in a ratio of 1:1 (v:v) as a solvent were mixed in a weight ratio of 100:20:150 (solid electrolyte particle:binder:solvent), preparing solid electrolyte slurry.

The solid electrolyte slurry was coated on a PET film and dried at a temperature range of 60° C. to 80° C., forming a sheet with a thickness of 20 μm. Accordingly, a solid electrolyte layer was formed in the form of a film attached to the PET film.

(2) Manufacture and Stacking of Electrode Layers $Li_3V_2(PO_4)_3$ particles having a diameter of 0.6 μm as electrode active material particles, $Li_{1.3}Al_{0.3}T_{1.7}(PO_4)_3$ particles having a diameter of 0.8 μm as solid electrolyte particles, a carbon conductor as a conductive material, and a PVB resin as a binder were mixed in a weight ratio of 59:40:1:10 (electrode active material particle: solid electrolyte particle:conductive material:binder), preparing an electrode paste.

Separately, copper (Cu) particles having a diameter of 2 μm and a PVB resin as a binder were mixed in a weight ratio of 100:5 (copper:binder), preparing a current collector paste.

On the surface of the solid electrolyte layer to which the PET film was not attached, an electrode paste/a current collector paste/an electrode paste (3 layers) were successively printed to form a first electrode layer. Specifically, the electrode paste was printed using a screen printing equipment, dried at 60° C. to 80° C., and the current collector paste was printed, and lastly, the electrode paste was printed In this way, the electrode paste/current collector paste/electrode paste (3 layers) were consecutively printed.

The solid electrolyte on which the electrode layer was formed was still attached on the PET film. Then, the electrode paste/the current collector paste/the electrode paste (3 layers) were successively printed again to form a second electrode layer. Herein, the second electrode layer was formed in the same method as the method of the first electrode layer.

Accordingly, a stacked body in which the first electrode layer-solid electrolyte layer—the second electrode layer were sequentially accumulated, vacuum-packaged in vinyl, and then, ISO-compressed at 80° C. under a pressure of 1000 kgf for 30 minutes.

The calcinated body was heated at 3° C./min under a mild reduction and nitrogen atmosphere and then, maintained for 10 hours under 0.5 MPa after reaching 700° C.

(5) External Electrode Formation

On both lateral sides of the sintered body, an Ag paste was coated and thermally cured at 150° C. Accordingly, a sintered all-solid-state battery cell according to the first embodiment was obtained.

Examples 2 to 5 and Comparative Examples 1 to 4

Sintered all-solid-state battery cells were manufactured in the same manner as Example 1 except that the diameter of the solid electrolyte and the diameter and sintering temperature of the electrode active material were changed as shown in Table 1.

Comparative Example 5

A sintered all-solid-state battery cell was manufactured in the same manner as Example 1 except that the composition of the electrode active material was changed as shown in Table 1.

Comparative Example 6

A sintered all-solid-state battery cell was manufactured in the same manner as Example 1 except that the composition of the electrode active material was changed as shown in Table 1.

Comparative Example 7

A sintered all-solid-state battery cell was manufactured in the same manner as Example 1 by changing the composition of the electrode active material as shown in Table 1 and proceeding only to the cutting in Example 1.

TABLE 1

| | Electrode active material particles (raw material) | | Solid electrolyte particles (raw material) | | | Sintering temper- |
|---|---|---|---|---|---|---|
| | Composition | Diameter (c) | Composition | Diameter (d) | d/c | ature (° C.) |
| Ex. 1 | $Li_3V_2(PO_4)_3$ | 0.6 | $Li_{1.3}Al_{0.3}Ti_{1.7}(PO_4)_3$ | 0.8 | 1.3 | 700 |
| Ex. 2 | $Li_3V_2(PO_4)_3$ | 0.6 | $Li_{1.3}Al_{0.3}Ti_{1.7}(PO_4)_3$ | 0.8 | 1.3 | 750 |
| Ex. 3 | $Li_3V_2(PO_4)_3$ | 0.6 | $Li_{1.3}Al_{0.3}Ti_{1.7}(PO_4)_3$ | 0.8 | 1.3 | 800 |
| Ex. 4 | $Li_3V_2(PO_4)_3$ | 0.6 | $Li_{1.3}Al_{0.3}Ti_{1.7}(PO_4)_3$ | 1.4 | 2.3 | 700 |
| Ex. 5 | $Li_3V_2(PO_4)_3$ | 0.6 | $Li_{1.3}Al_{0.3}Ti_{1.7}(PO_4)_3$ | 1.4 | 2.3 | 750 |
| Comp. Ex. 1 | $Li_3V_2(PO_4)_3$ | 0.4 | $Li_{1.3}Al_{0.3}Ti_{1.7}(PO_4)_3$ | 1.4 | 3.5 | 700 |
| Comp. Ex. 2 | $Li_3V_2(PO_4)_3$ | 0.4 | $Li_{1.3}Al_{0.3}Ti_{1.7}(PO_4)_3$ | 1.4 | 3.5 | 750 |
| Comp. Ex. 3 | $Li_3V_2(PO_4)_3$ | 2.5 | $Li_{1.3}Al_{0.3}Ti_{1.7}(PO_4)_3$ | 0.6 | 0.2 | 700 |
| Comp. Ex. 4 | $Li_3V_2(PO_4)_3$ | 2.5 | $Li_{1.3}Al_{0.3}Ti_{1.7}(PO_4)_3$ | 0.6 | 0.2 | 750 |
| Comp. Ex. 5 | $Li_3V_2(PO_4)_3$ | 0.6 | $Li_2S—P_2S_5$ | 0.6 | 1.3 | 700 |
| Comp. Ex. 6 | $LiCoO_2$ | 0.6 | $Li_{1.3}Al_{0.3}Ti_{1.7}(PO_4)_3$ | 0.8 | 1.3 | 700 |
| Comp. Ex. 7 | $LiCoO_2$ | 0.6 | $Li_2S$~$P_2S_5$ | 0.6 | 1.3 | 750 |

(3) Cutting

The compressed body was cut into a size of width*length=10 mm*10 mm. Accordingly, an all-solid-state battery cell according to the second embodiment was obtained.

(4) Calcination and Sintering

The body was calcinated at 450° C. to 500° C. under an air atmosphere for 42 hours. In the body calcinated under the condition, all the binder could be removed.

Evaluation Example 1: SEM

The sintered all-solid-state battery cell of Example 4 was cut in the stacking direction, and an SEM photograph (FIG. 3) of the cut surface was taken at a magnification of 10,000 times by using a scanning electron microscope made by Carl Zeiss AG.

For convenience, a dotted line distinguishing an electrode layer from a solid electrolyte layer was shown in FIG. 3.

On the SEM photograph, major axis lengths and short axis lengths of individual particles constituting each layer were respectively measured to obtain averages, which were used to obtain an average of all the particles on the SEM photograph. In other words, a "diameter of the particles" or a "size of the particles" were obtained according to the following equation A.

$$\left[\sum\{(\text{average of major axis length and short axis length of first particle}) + (\text{average of major axis length and short axis length of second particle})\} + \ldots + (\text{average of major axis length and short axis length of } n^{th} \text{ particle})\}\right]/n \quad \text{[Equation A]}$$

All the other examples and comparative examples as well as Example 4 were equally processed, and the results are shown in Table 2.

TABLE 2

| | Electrode active material particle (final material) | | Solid electrolyte particle (final material) | | | Sintering temperature |
|---|---|---|---|---|---|---|
| | Composition | Diameter (a) | Composition | Diameter (b) | b/a | (° C.) |
| Ex. 1 | $Li_3V_2(PO_4)_3$ | 2.8 | $Li_{1.3}Al_{0.3}Ti_{1.7}(PO_4)_3$ | 4 | 1.4 | 700 |
| Ex. 2 | $Li_3V_2(PO_4)_3$ | 3.7 | $Li_{1.3}Al_{0.3}Ti_{1.7}(PO_4)_3$ | 5 | 1.4 | 750 |
| Ex. 3 | $Li_3V_2(PO_4)_3$ | 4.5 | $Li_{1.3}Al_{0.3}Ti_{1.7}(PO_4)_3$ | 6 | 1.3 | 800 |
| Ex. 4 | $Li_3V_2(PO_4)_3$ | 3.7 | $Li_{1.3}Al_{0.3}Ti_{1.7}(PO_4)_3$ | 4.5 | 1.2 | 700 |
| Ex. 5 | $Li_3V_2(PO_4)_3$ | 4.5 | $Li_{1.3}Al_{0.3}Ti_{1.7}(PO_4)_3$ | 5 | 1.1 | 750 |
| Comp. Ex. 1 | $Li_3V_2(PO_4)_3$ | 1.8 | $Li_{1.3}Al_{0.3}Ti_{1.7}(PO_4)_3$ | 5 | 2.8 | 700 |
| Comp. Ex. 2 | $Li_3V_2(PO_4)_3$ | 1.9 | $Li_{1.3}Al_{0.3}Ti_{1.7}(PO_4)_3$ | 6 | 3.2 | 750 |
| Comp. Ex. 3 | $Li_3V_2(PO_4)_3$ | 5.4 | $Li_{1.3}Al_{0.3}Ti_{1.7}(PO_4)_3$ | 1.8 | 0.3 | 700 |
| Comp. Ex. 4 | $Li_3V_2(PO_4)_3$ | 5.9 | $Li_{1.3}Al_{0.3}Ti_{1.7}(PO_4)_3$ | 1.2 | 0.2 | 750 |
| Comp. Ex. 5 | $Li_3V_2(PO_4)_3$ | 3.0 | $Li_2S—P_2S_5$ | 3.2 | 1.0 | 700 |
| Comp. Ex. 6 | $LiCoO_2$ | 2.4 | $Li_{1.3}Al_{0.3}Ti_{1.7}(PO_4)_3$ | 3.5 | 1.4 | 700 |
| Comp. Ex. 7 | $LiCoO_2$ | 3.2 | $Li_2S—P_2S_5$ | 4.8 | 1.5 | 750 |

In Table 2, the diameter (a) of the electrode active material particles after the sintering tended to be larger, as the diameter (c) of the electrode active material particles before the sintering was larger, and the sintering temperature was higher, In addition, the diameter (b) of the solid electrolyte particles after the sintering tended to be larger, as the diameter (d) of the solid electrolyte particles was larger, and the sintering temperature was higher.

Evaluation Example 2: Interfacial Resistance and Discharge Capacity

The sintered all-solid-state battery cells according to Examples 1 to 5, the sintered all-solid-state battery cells according to Comparative Example 1 to 6, and the all-solid-state battery according to Comparative Example 7 were evaluated in the following method, and the results are shown in Table 3.

Electrode layer-solid electrolyte layer interfacial resistance: CC/CV charge at 1.6 V and 5 mA (cut-off condition) and CC discharge at 1.5 V and 0.1 mA were three times repeated. Subsequently, a voltage drop occurring when the full-charged cells were discharged for 30 minutes with a current of 0.1 mA for 30 minutes was recorded, and DC-resistance was calculated by using R=V/I (Ohm's Law).

Discharge capacity: 0.33 C discharge capacity was measured by conducting 0.33 C charge after each one conducting 0.1 C charge and 0.1 C discharge, 0.1 C charge and 0.33 C discharge, and 0.1 C charge and 1 C discharge in a constant temperature chamber at 25° C.

TABLE 3

| | Interfacial resistance (kΩ) | Discharge capacity (μA) |
|---|---|---|
| Example 1 | 111 | 3.4 |
| Example 2 | 85 | 4.6 |
| Example 3 | 62 | 5.2 |
| Example 4 | 72 | 4.8 |
| Example 5 | 48 | 6.3 |
| Comparative Example 1 | 258 | 0.7 |
| Comparative Example 2 | 198 | 1.2 |
| Comparative Example 3 | 350 | 0.8 |
| Comparative Example 4 | 221 | 0.9 |
| Comparative Example 5 | 115 | 2.4 |
| Comparative Example 6 | 99 | 3.1 |
| Comparative Example 7 | 121 | 4.2 |

In Table 3, Examples 1 to 5 exhibited significantly lower interfacial resistance and greatly higher discharge capacity than Comparative Examples 1 to 7. When the diameter (d) of the solid electrolyte particles before the sintering was controlled within 0.5 times to 2.5 times of the diameter (c) of the electrode active material particles before the sintering, compared with when not controlled within the range, interfacial resistance of the solid electrolyte layer and electrode layer was significantly decreased, and thereby, capacity of the sintered all-solid-state battery cells was greatly increased. After the sintering, the diameter (b) of the solid electrolyte particles was also controlled within 0.5 to 2.5 times of the diameter (a) of the electrode active material particles after the sintering.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

The invention claimed is:

1. An all-solid-state battery, being a sintered all-solid-state battery, comprising:

a positive electrode layer, a solid electrolyte layer, and a negative electrode layer;

wherein the positive electrode layer and the negative electrode layer include the same or different electrode active material particles, the solid electrolyte layer includes solid electrolyte particles; and an average diameter (a) of the electrode active material particles after sintering and an average diameter (b) of the solid electrolyte particles after sintering satisfy a relationship of an Equation 1:

$$1.1 \leq (b/a) \leq 1.4 \quad \text{[Equation 1]}$$

wherein the electrode active material particles include particles represented by a Chemical Formula 1:

[Chemical Formula 1]

$$Li_x V_{2-y}M_y(P0_4)_3$$

wherein, in the Chemical Formula 1,

M is at least one selected from the group consisting of Fe, Co, Mn, Cu, Zn, Al, Sn, B, Ga, Cr, V, Ti, Mg, Ca, Sr, and Zr;

$$1 \leq x \leq 3; \text{ and}$$

$$0 \leq y < 2.$$

2. The all-solid-state battery of claim 1, wherein the average diameter (a) of the electrode active material particles is about 2 μm to about 10 μm.

3. The all-solid-state battery of claim 1, wherein the solid electrolyte particles include particles represented by a Chemical Formula 2:

[Chemical Formula 2]

$$Li_{1+y}Al_yTi_{2-y}(PO_4)_3$$

wherein, $$0 < y \leq 0.6.$$

4. The all-solid-state battery of claim 1, wherein the average diameter (b) of the solid electrolyte particles is about 2 μm to about 10 μm.

5. The all-solid-state battery of claim 1, wherein the positive electrode layer and the negative electrode layer each independently include a current collector; and an electrode active material layer disposed on one or both surfaces of the current collector and including the electrode active material particles.

6. The all-solid-state battery of claim 5, wherein the electrode active material layer further includes solid electrolyte particles that are the same as or different from those of the solid electrolyte layer.

7. The all-solid-state battery of claim 5, wherein the electrode active material layer includes the electrode active material particles and the solid electrolyte particles in a weight ratio of about 1:9 to about 9:1.

8. The all-solid-state battery of claim 7, wherein the electrode active material layer further includes a conductive material.

9. The all-solid-state battery of claim 8, wherein the solid electrolyte particles are included in an amount of about 15 wt % to about 60 wt %, the conductive material is included in an amount of about 1 wt % to about 5 wt %, and the electrode active material particles is included in a balance based on a total weight of the electrode active material layer.

10. The all-solid-state battery of claim 5, wherein the electrode active material layer has a thickness of about 1.0 μm to about 20 μm.

11. The all-solid-state battery of claim 5, wherein the current collector includes copper particles.

12. The all-solid-state battery of claim 11, wherein an average diameter of the copper particles is about 0.5 μm to about 5 μm.

13. The all-solid-state battery of claim 1, wherein a thickness of the solid electrolyte layer is about 1.0 μm to about 30 μm.

14. The all-solid-state battery of claim 1, wherein the sintered all-solid-state battery includes a body including the positive electrode layer and the negative electrode layer alternately stacked with the solid electrolyte layer interposed therebetween.

15. The all-solid-state battery of claim 14, wherein the sintered all-solid-state battery further includes a first external electrode and a second external electrode respectively disposed on both sides of the body.

16. An all-solid-state battery, comprising:

a positive electrode layer, a solid electrolyte layer, and a negative electrode layer;

wherein the positive electrode layer and the negative electrode layer include electrode active material particles represented by a Chemical Formula 1 that are the same as or different from each other; the solid electrolyte layer includes solid electrolyte particles represented by a Chemical Formula 2; and an average diameter (a) of the electrode active material particles after sintering and an average diameter (b) of the solid electrolyte particles after sintering satisfy a relationship of an Equation 1:

[Chemical Formula 1]

$$Li_xV_{2-y}M_y(PO_4)_3$$

wherein, in the Chemical Formula 1,

M is at least one selected from the group consisting of Fe, Co, Mn, Cu, Zn, Al, Sn, B, Ga, Cr, V, Ti, Mg, Ca, Sr, and Zr;

$$1 \leq x \leq 3; \text{ and}$$

$$0 \leq y < 2;$$

[Chemical Formula 2]

$$Li_{1+y}Al_yTi_{2-y}(PO_4)_3$$

wherein, in the Chemical Formula 2, $$0 < y \leq 0.6;$$

$$1.1 \leq (b/a) \leq 1.4. \quad \text{[Equation 1]}$$

17. The all-solid-state battery of claim 16, wherein the all-solid-state battery is a sintered all-solid-state battery.

* * * * *